US007702541B2

(12) United States Patent
Black et al.

(10) Patent No.: US 7,702,541 B2
(45) Date of Patent: Apr. 20, 2010

(54) TARGETED E-COMMERCE SYSTEM

(75) Inventors: Peter M. Black, Pacific Palisades, CA (US); Anthony Bryan Waters, Rowlett, TX (US)

(73) Assignee: Yahoo! Inc., Sunnyvale, CA (US)

( * ) Notice: Subject to any disclaimer, the term of this patent is extended or adjusted under 35 U.S.C. 154(b) by 328 days.

(21) Appl. No.: 09/738,471

(22) Filed: Dec. 15, 2000

(65) Prior Publication Data

US 2002/0016741 A1 Feb. 7, 2002

Related U.S. Application Data

(63) Continuation-in-part of application No. 09/630,227, filed on Aug. 1, 2000, and a continuation-in-part of application No. 09/703,006, filed on Oct. 31, 2000, now Pat. No. 6,546,386.

(51) Int. Cl.
G06Q 30/00 (2006.01)
(52) U.S. Cl. .............................. 705/26; 705/27; 705/10; 705/14; 715/234; 715/811; 709/219; 707/3
(58) Field of Classification Search .................. 705/26, 705/27, 1, 14, 10; 707/1, 2, 3, 4, 5, 7, 8, 707/10, 514, 513; 704/7, 9, 243; 709/219; 715/234
See application file for complete search history.

(56) References Cited

U.S. PATENT DOCUMENTS

| | | | | |
|---|---|---|---|---|
| 5,297,039 A | * | 3/1994 | Kanaegami et al. ............ 707/5 |
| 5,359,724 A | | 10/1994 | Earle |
| 5,590,197 A | * | 12/1996 | Chen et al. .................... 705/65 |
| 5,598,557 A | * | 1/1997 | Doner et al. ................... 707/5 |
| 5,619,410 A | | 4/1997 | Emori et al. |
| 5,659,732 A | | 8/1997 | Kirsch |
| 5,675,510 A | * | 10/1997 | Coffey et al. ............... 709/224 |
| 5,708,780 A | * | 1/1998 | Levergood et al. .......... 709/229 |
| 5,712,979 A | * | 1/1998 | Graber et al. ............... 709/224 |
| 5,715,453 A | * | 2/1998 | Stewart ...................... 715/513 |

(Continued)

FOREIGN PATENT DOCUMENTS

WO WO/95/02221 9/1995

(Continued)

OTHER PUBLICATIONS

White, Ron, How Computers Work, Millennium Ed., Que Corporation, Sep. 22, 1999.*
Derfler, Frank J. et. al. How Networks Work, Millennium Ed., Que Corporation, Aug. 23, 2000.*

(Continued)

*Primary Examiner*—Vanel Frenel
(74) *Attorney, Agent, or Firm*—Seth H. Ostrow; Ostrow Kaufman & Frankl LLP (57) ABSTRACT

A system for displaying products for purchase on any document displayed on any computer device, comprising conducting a statistical frequency analysis of the word occurrence in the document to determine the primary subject matter of the document and/or keywords in the document, selecting products which are relevant to the subject matter and keywords of the document, either by manual selection or by automatic selection. Automatic selection is accomplished by conducting a statistical frequency analysis of the word occurrence in the product descriptions to determine the keywords in the product descriptions and matching the keywords from the document with the keywords from the product descriptions.

12 Claims, 5 Drawing Sheets

U.S. PATENT DOCUMENTS

| | | | |
|---|---|---|---|
| 5,717,860 A * | 2/1998 | Graber et al. | 709/227 |
| 5,717,923 A * | 2/1998 | Dedrick | 707/102 |
| 5,724,521 A * | 3/1998 | Dedrick | 705/26 |
| 5,745,681 A * | 4/1998 | Levine et al. | 709/200 |
| 5,751,956 A * | 5/1998 | Kirsch | 709/203 |
| 5,761,662 A * | 6/1998 | Dasan | 707/10 |
| 5,768,581 A | 6/1998 | Cochran | |
| 5,774,660 A | 6/1998 | Brendel et al. | |
| 5,778,397 A | 7/1998 | Kupiec et al. | |
| 5,787,253 A * | 7/1998 | McCreery et al. | 709/231 |
| 5,794,237 A | 8/1998 | Gore, Jr. | |
| 5,796,952 A * | 8/1998 | Davis et al. | 709/224 |
| 5,812,769 A * | 9/1998 | Graber et al. | 709/228 |
| 5,815,657 A * | 9/1998 | Williams et al. | 705/1 |
| 5,835,087 A * | 11/1998 | Herz et al. | 715/810 |
| 5,845,278 A | 12/1998 | Kirsch et al. | |
| 5,848,396 A * | 12/1998 | Gerace | 705/10 |
| 5,918,014 A * | 6/1999 | Robinson | 709/219 |
| 5,918,240 A | 6/1999 | Kupiec et al. | |
| 5,920,854 A | 7/1999 | Kirsch et al. | |
| 5,933,811 A * | 8/1999 | Angles et al. | 705/14 |
| 5,948,061 A * | 9/1999 | Merriman et al. | 709/219 |
| 5,959,623 A * | 9/1999 | van Hoff et al. | 715/719 |
| 5,983,216 A | 11/1999 | Kirsch et al. | |
| 6,009,410 A * | 12/1999 | LeMole et al. | 705/14 |
| 6,014,638 A * | 1/2000 | Burge et al. | 705/27 |
| 6,016,504 A * | 1/2000 | Arnold et al. | 709/200 |
| 6,041,323 A | 3/2000 | Kubota | |
| 6,052,730 A * | 4/2000 | Felciano et al. | 709/225 |
| 6,094,657 A * | 7/2000 | Hailpern et al. | 707/103 R |
| 6,115,690 A * | 9/2000 | Wong | 705/7 |
| 6,128,663 A * | 10/2000 | Thomas | 709/228 |
| 6,185,614 B1 * | 2/2001 | Cuomo et al. | 709/224 |
| 6,278,992 B1 | 8/2001 | Curtis et al. | |
| 6,279,001 B1 * | 8/2001 | DeBettencourt et al. | 707/10 |
| 6,285,985 B1 * | 9/2001 | Horstmann | 705/14 |
| 6,285,987 B1 * | 9/2001 | Roth et al. | 705/27 |
| 6,286,000 B1 | 9/2001 | Apte | |
| 6,321,256 B1 * | 11/2001 | Himmel et al. | 709/218 |
| 6,330,592 B1 * | 12/2001 | Makuch et al. | 709/217 |
| 6,338,050 B1 * | 1/2002 | Conklin et al. | 705/80 |
| 6,338,059 B1 * | 1/2002 | Fields et al. | 707/4 |
| 6,339,761 B1 * | 1/2002 | Cottingham | 705/14 |
| 6,460,036 B1 * | 10/2002 | Herz | 707/10 |
| 6,463,428 B1 | 10/2002 | Lee et al. | |
| 6,490,602 B1 * | 12/2002 | Kraemer | 715/236 |
| 6,496,857 B1 * | 12/2002 | Dustin et al. | 709/219 |
| 6,505,194 B1 | 1/2003 | Nikolovska et al. | |
| 6,516,338 B1 * | 2/2003 | Landsman et al. | 709/203 |
| 6,546,386 B1 * | 4/2003 | Black et al. | 707/4 |
| 6,615,247 B1 * | 9/2003 | Murphy | 709/217 |
| 6,701,307 B2 * | 3/2004 | Himmelstein et al. | 707/3 |
| 6,763,386 B2 * | 7/2004 | Davis et al. | 709/224 |
| 6,850,896 B1 * | 2/2005 | Kelman et al. | 705/10 |
| 6,925,442 B1 * | 8/2005 | Shapira et al. | 705/10 |
| 6,976,207 B1 * | 12/2005 | Rujan et al. | 715/500 |
| 7,194,678 B1 * | 3/2007 | Koike et al. | 715/234 |
| 7,295,995 B1 * | 11/2007 | York et al. | 705/26 |
| 7,386,485 B1 * | 6/2008 | Mussman et al. | 705/26 |
| 2002/0016741 A1 | 2/2002 | Black et al. | |
| 2002/0022963 A1 * | 2/2002 | Miller et al. | 705/1 |
| 2002/0035573 A1 | 3/2002 | Black et al. | |
| 2004/0199575 A1 * | 10/2004 | Geller | 709/201 |

FOREIGN PATENT DOCUMENTS

WO     WO 99/45487     9/1999

OTHER PUBLICATIONS

Gralla, Preston, How the Internet Works, Millennium Ed., Que Corporation, Sep. 23, 1999.*
Muller, Nathan J., Desktop Encyclopedia of the Internet, Artech House, Inc., 1998.*
Borland's Paradox for Windows User's Guide, Borland International, Inc, 1994.*
Borland's ReportSmith for Windows User's Guide, Borland International, Inc, 1994.*
Berry, Michael J. A., and Linoff, Gordon, Data Mining Techniques for Marketing, Sales, and Customer Support. John Wiley & Sons, Jul. 1997.*
Riley, David D., Data Abstraction and Stucture, An Introduction to Computer Science II, Boyd and Fraser Publishing Company, 1987.*
Spiegel, Murray R., Schaum's Outline of Theory and Problems of Statitics, 2nd Ed., McGraw-Hill, Inc., 1988.*
Bragg, Steven M., Accounting Best Practices, John Wiley and Sons, Inc., 1999.*
S. Jones (1999) "Topic-Based Browsing With In a Digital Library using Keyphrases", ACM DL, Aug. 11-14, pp. 114-121; and Phraiser ( ) "A System for Interactive Document Retrieval Using keyphrases".
"Trec and Tipster Experiments with Inquery", Callan et al., pp. 1-18, Jun. 24, 1994.
"The Smart Automatic Document Retrieval System-An Illustration", Salton et al.; Communications of the ACM, vol. 8, No. 6, pp. 391-398, Jun. 1965.
"A Vector Space Model for Automatic Indexing", Salton et al., Communications of the ACM, vol. 18, No. 11, pp. 613-620, Nov. 1975.
"An Experimental Comparison of the Effectiveness of Computers and Humans as Search Intermediaries", Marcus, R.S., Journal of the American Society for Information Science, 34(6):381-404, 1983.
"The Inquery Retrieval System", Callan et al., Database and Expert Systems Applications, pp. 78-83, 1992.
"Clustering Algorithms", Rasmussen, E; University of Pittsburgh, pp. 419-442, 1992.
"Internet Resource Discovery Services", Obraczka et al., University of Southern California, pp. 8-22, 1993.
"Dr-Link™ For Use on Netscape Navigator Quick Start Guide" Manning & Napier Information Services, 1996.
"Distributed Indexing: A Scalable Mechanism for Distributed Information Retrieval", Danzig, P. et al., University of Southern California, pp. 220-229, 1991.
"The Effectiveness of Gloss for the Text Database Discovery Problem", Gravano, L. et al., ACM SIGMOD, pp. 126-137, 1994.
"Compound Document Processing System", Al-Hawamdeh, S. et al., IEEE, pp. 640-644, 1991.
"Harvest: A Scalable, Customizable Discovery and Access System" Bowman, C. et al., University of Colorado, pp. 1-27, 1994.
"Growing Company Changes Data Entry—TextWare Outpoints Southern Computer Systems in Evaluation", Carol Curran, vol. 4; 3, Imaging World, 1995.
"An Industrial Strength Document Warehouse Solution", Dataware Technologies, pp. 1-12, 1996.
"What OLE Is Really About", Brockschmidt, K., OLE Development, pp. 1-59, http://www.Microsof t.com/oledev/olecom/aboutole.htm, 1997.
"Hypertext: An Introduction and Survey" Conklin, J., IEEE, pp. 17-41, 1987.
"Chapter 1: Component Object Model Introduction", OLE Development, pp. 1-37, http://www.Microsoft.com/oledev/olecom/Ch01.htm, 1997.
Voyager Stores and the World Wide Web, http://www.voyagerco.com, 1996-97.
"Common Questions Asked About ZyIMAGE", pp. 1-6, http://www.zylab.n1/Exe/ZyNET.exe, 1997.
"Powerful Imaging and Full Text Retrieval for Publishing On-Line", p. 1, http://zylab.n1/zylab/p2/zyimageweb.html, 1996.
"The Full Text Retrieval & Publishing Experts", p. 1, http://www.irt.n1 (1996).
"UK Police put Criminals On-Line with New National Computer", Young, M., Imaging Magazine (1995).
"Common Questions Asked About ZyIMAGE", pp. 1-6, htp://www.zylab.n1/Exe/ZyNET.exe, (1997).
"Instant Information Access", TextWare Corporation (1996).
"Tijuana Data Entry Shop Logs 500K Forms/Day", Spencer, H., ImagingWorld, vol. 4; 4, (1995).

"Needles in Document Haystacks", Spitzer, T., *Database & Client/Server Solutions*, pp. 84-87 (1996).
"Text Retrieval Products & Services", http://www.textware.com/txtrtrvl.html, 1996.
"Organizations Worldwide Take Content Onto the Web with NetAnswer", *Dataware Technologies* (1996).
"Edit Trail", Ores, P., *PC Magazine*, pp. 133-138 (1995).
"The Forms Processing Paradigm Shift", Moore, A., *Imaging Magazine* (1995).
"NetAnswer™ Hosting Service", *Dataware Technologies, Inc.*, 1995.
"NetAnswer™ Information Super Server for the World Wide Web", *Dataware Technologies, Inc.*, 1995.
"TextWare's FormWare—Complex Data Capture That Puts Simplicity First" Harney, J., *Imaging Magazine* (1996).
"Fuzzy Searching",http://www.cris.com/-eti/fuzzyhtml (1996).
"Infoseek Adds New Search Features", Sullivan, D., SearchEngineWatch.com, http://searchenginewatch.com/sereport/article.php/2167241, pp. 1-3 (Jun. 2, 1999).
"AltaVista Adds Related Search Prompter", Sullivan, D., SearchEngineWatch.com, http://searchenginewatch.com/sereport/article.php/2166801, pp. 1-2 (Nov. 4, 1998).
"AltaVista Launches Prisma", *Pandia*, pp. 1-6, http://www.pandia.com/sw-2002/22-altavista.htmi (Jul. 2, 2002).
"Okapi at TREC-3", Robertson et al., *Centre for Interactive Systems Research of Information Science City University*, pp. 109-230, 1995.
"The Collection Fusion Problem", Voorhees E., et al., *Siemens Corporate Research, Inc*. pp. 95-104, 1995.
"Efficient Probabilistic Inference for Text Retrieval", Turtle, H. et al, *Intelligent Text and Image Handling*, pp. 644-661 (1991).
"Evaluation of an Inference Network-Based Retrieval Model", Turtle, H., *acm Transactions on Information Systems*, pp. 187-222, vol. 9; 3 (1991).
"Searching Far and Wide: The Powerful Document Retrieval Software of PLS", Banet, B., *Seybold Report on Desktop Publishing*, vol. 10; 8 (Apr. 22, 1996).
"Search Engine Reviews", Sullivan, D., SearchEngineWatch.com, pp. 1-15, http://www.searchenginewatch.com/resources/article.php/2156581 (Nov. 15, 2002).
"How Search Engines Work", Sullivan, D., SearchEngineWatch.com, pp. 1-3, http://www.searchenginewatch.com/resources/article.php/2168031 (Nov. 14, 2002).
"Search Engines: Court Cases, Lawsuits and Legal Issues", Sullivan, D., SearchEngineWatch.com, pp. 1-16, http://www.searchenginewatch.com/resources/article.php/2156541 (May 15, 2003).
"About Search Engines", *Leap Publications*, http://leapint.dircon.co.uk/about_search_engines.htm (Jul. 8,2003).
"Search Engine Page Ranking", Watson, G., http://256.com/gray/docs/search.html, pp. 1-5 (2000).
"Free Full Text: FindArticles and MagPortal" Notess, G. http://www.infotoday.com/online/jul02/OnTheNet.htm, pp. 1-4 (Jul./Aug. 2002).
"Betting on Web Search, Inktomi Unveils Upgrades", Haley, C., http://www.internetnews.com/IAR/article.php/1545671, pp. 1-4 (Nov. 20, 2002).
"Internet Brand Leaders Dominate Low Price Competitors, MIT Study Shows", http://www.globaltechnoscan.com/28thJune-4thJuly/internet_brand.htm, pp. 1-3 (Jul. 8, 2003).
"Our Amazon.com Policy", http://monkeyfist.com/profile/amazon (Jul. 8, 2003).
"Where Are They Now? Search Engines We've Known & Loved", Sullivan, D., http://www.searchenginewatch.com/sereport/article.php/2175241, pp. 1-4 (Mar. 4, 2003).
"Choosing", Boedeker, T. et al., *Law Office Computing* pp. 50-55 (1995).
"Boolean Searching" http://www.cris.com/-eti/Boolean.html (1996).
"Agent Searching" http://www.cris.com/-eti/agent.html (1996).
"An Essential Ingredient: Post Recognition Processing", Bish, R., *Imaging World* (1996).
"Forms Processing Products & Services", http://www.textware.com/formspro.html, pp. 1-3, 1996.
"Your Forms Processing Solution", *FormWare for Windows 95/NT* (1995).
"Introduction to Dataware's CD-ROM Product and Services", pp. 1-12, http://www.dataware.com/site/prodserv/cdintro.htm (Nov. 12, 1996).
"Issues in the Design of Hypermedia Systems", Halasz, F. (1990).
"Dataware Lands $6.6M GPO Pact", Moore J., *Marketplace*, pp. 84, 86 (1995).
"Personal Text-Retrieval Software Works with Calera's WordScan", ZyLAB, *PCMagazine* p. 68 (Jan. 24, 1995).
"Retrieving Text on the Net", ZyLAB, *PC Magazine*, p. 61, (Nov. 21, 1995).
"Hip Products" ZyLAB Europe BV.—Products, p. 1, http://www.zylab.nl/zylab/p2/prods.html (Dec. 29, 1997).
"HyperWriter for Windows", *PC Magazine*, pp. 140-142 (Feb. 7, 1995).
Product Summary of MicroRetrieval Corp., Text and image search/retrieval program, Software product specification, p. 1, Nov. 1993.
Jupiterdirect—Search Engines, p. 1, http://www.jupiterdirect.com/bin/container.p1/897 (Jul. 8, 2003).
G. Pascal Zachery, "The Godfather." *Wired*. Wired (unknown), Nov. 30, 1997.
Steve Ditlea, "Ted Nelson's Big Step." techreview.com. techreview.com (unknown), Oct. 31, 1998.
Webopedia, "hypertext," *Webopedia*, Webopedia (unknown) Sep. 1, 1996.
Webopedia, "hypermedia," *Webopedia*, Webopedia (unknown) Oct. 5, 1997.
Webopedia, "hyperlink," *Webopedia*, Webopedia (unknown) Feb. 25, 1997.
Webopedia, "hot link," *Webopedia*, Webopedia (unknown) Sep. 1, 1996.
L. Hillman, "Sum: Am. English Word Frequency Lists," *Linguist* List 7.583, Oct. 31, 1996.
J.M. Carroll, et al. "Computer Selection of Keywords Using Word-Frequency Analysis," http://www.vuw.ac.nz/lals/lals508/vrc.html, Washington, D.C., vol. 20, No. 3, pp. 227-233, Sep. 5, 1969.
"Trec and Tipster Experiments with Inquery", Callan et al., pp. 1-18 (1994).
"The Smart Automatic Document Retrieval System—An Illustration", Salton et al.; *Communications of the ACM*, pp. 391-398 (1965).
"A Vector Space Model for Automatic Indexing", Salton et al., *Communications of the ACM*, pp. 613-620 (1975).
"An Experimental Comparison of the Effectiveness of Computers and Humans as Search Intermediaries", Marcus, R.S., *Journal of the American Society for Information Science*, pp. 381-404 (1983).
"The Inquery Retrieval System", Callan et al., *Database and Expert Systems Applications*, pp. 78-83 (1992).
"Clustering Algorithms", Rasmussen, E; *University of Pittsburgh*, pp. 419-442.
"Internet Resource Discovery Services", Obraczka et al., *University of Southern California*, pp. 8-22 (1993).
"Dr-Link™ For Use on Netscape Navigator Quick Start Guide" *Manning & Napier Information Services* (1996).
"Distributed Indexing: A Scalable Mechanism for Distributed Information Retrieval", Danzig, P. et al., *University of Southern California*, pp. 220-229 (1991).
"The Effectiveness of Gloss for the Text Database Discovery Problem", Gravano, L. et al., *ACM SIGMOD*, pp. 126-137 (1994).
"Compound Document Processing System", Al-Hawamdeh, S. et al., *IEEE*, pp. 640-644 (1991).
"Harvest: A Scalable, Customizable Discovery and Access System" Bowman, C. et al., *University of Colorado*, pp. 1-27 (1994).
"Growing Company Changes Data Entry—TextWare Outpoints Southern Computer Systems in Evaluation", Carol Curran, vol. 4; 3, *Imaging World* (1995).
"An Industrial Strength Document Warehouse Solution", *Dataware Technologies*, pp. 1-12 (1996).
"What OLE Is Really About", Brockschmidt, K., *OLE Development*, pp. 1-59, http://www.Microsoft.com/oledev/olecom/aboutole.htm, (1997).
"Hypertext: An Introduction and Survey" Conklin, J., *IEEE*, pp. 17-41 (1987).

"Chapter 1: Component Object Model Introduction", *OLE Development*, pp. 1-37, http://www.Microsoft.com/oledev/olecom/Ch01.htm (1997).

Voyager Stores and the World Wide Web, http://www.voyagerco.com.

"Common Questions Asked About ZyIMAGE", pp. 1-6, http://www.zylab.n1/Exe/ZyNET.exe, (1997).

"Powerful Imaging and Full Text Retrieval for Publishing On-Line", p. 1, http://zylab.n1/zylab/p2/zyimageweb.html (1996).

"The Full Text Retrieval & Publishing Experts", p. 1, http://www.irt.n1 (1996).

"UK Police put Criminals On-Line with New National Computer", Young, M., *Imaging Magazine* (1995).

"Common Questions Asked About ZyIMAGE", pp. 1-6, htp://www.zylab.n1/Exe/ZyNET.exe, (1997).

"Instant Information Access", *TextWare Corporation* (1996).

"Tijuana Data Entry Shop Logs 500K Forms/Day", Spencer, H.,*Imaging World*, vol. 4; 4, (1995).

"Needles in Document Haystacks", Spitzer, T., *Database & Client/Server Solutions*, pp. 84-87 (1996).

"Text Retrieval Products & Services", http://www.textware.com/txtrirvl.htm.

"Organizations Worldwide Take Content Onto the Web with NetAnswer", *Dataware Technologies* (1996).

"Edit Trail", Ores, P., *PC Magazine*, pp. 133-138 (1995).

"The Forms Processing Paradigm Shift", Moore, A., *Imaging Magazine* (1995).

"NetAnswer™ Hosting Service", *Dataware Technologies, Inc.*

"NetAnswer™ Information Super Server for the World Wide Web", *Dataware Technologies, Inc.*

"TextWare's FormWare—Complex Data Capture That Puts Simplicity First" Harney, J., *Imaging Magazine* (1996).

"Fuzzy Searching", http://www.cris.com/-eti/fuzzyhtml (1996).

"Infoseek Adds New Search Features", Sullivan, D., SearchEngineWatch.com, http://searchenginewatch.com/sereport/article.php/2167241, pp. 1-3 (Jun. 2, 1999).

"AltaVista Adds Related Search Prompter", Sullivan, D., SearchEngineWatch.com, http://searchenginewatch.com/sereport/article.php/2166801, pp. 1-2 (Nov. 4, 1998).

"AltaVista Launches Prisma", *Pandia*, pp. 1-6, http://www.pandia.com/sw-2002/22-altavista.htmi (Jul. 2, 2002).

"Okapi at TREC-3", Robertson et al., *Centre for Interactive Systems Research of Information Science City University*, pp. 109-230.

"The Collection Fusion Problem", Voorhees E., et al., *Siemens Corporate Research, Inc.* pp. 95-104.

"Efficient Probabilistic Inference for Text Retrieval", Turtle, H. et al, *Intelligent Text and Image Handling*, pp. 644-661 (1991).

"Evaluation of an Inference Network-Based Retrieval Model", Turtle, H., *acm Transactions on Information Systems*, pp. 187-222, vol. 9; 3 (1991).

"Searching Far and Wide: The Powerful Document Retrieval Software of PLS", Banet, B., *Seybold Report on Desktop Publishing*, vol. 10; 8 (Apr. 22, 1996).

"Search Engine Reviews", Sullivan, D., SearchEngineWatch.com, pp. 1-15, http://www.searchenginewatch.com/resources/article.php/2156581 (Nov. 15, 2002).

"How Search Engines Work", Sullivan, D., SearchEngineWatch.com, pp. 1-3, http://www.searchenginewatch.com/resources/article.php/2168031 (Nov. 14, 2002).

"Search Engines: Court Cases, Lawsuits and Legal Issues", Sullivan, D., SearchEngineWatch.com, pp. 1-16, http://www.searchenginewatch.com/resources/article.php/2156541 (May 15, 2003).

"About Search Engines", *Leap Publications*, http://leapint.dircon.co.uk/about_search_engines.htm (Jul. 8, 2003).

"Search Engine Page Ranking", Watson, G., http://256.com/gray/docs/search.html, pp. 1-5 (2000).

"Free Full Text: FindArticles and MagPortal" Notess, G. http://www.infotoday.com/online/jul02/OnTheNet.htm, pp. 1-4 (Jul./Aug. 2002).

"Betting on Web Search, Inktomi Unveils Upgrades", Haley, C., http://www.internetnews.com/IAR/article.php/1545671, pp. 1-4 (Nov. 20, 2002).

"Internet Brand Leaders Dominate Low Price Competitors, MIT Study Shows", http://www.globaltechnoscan.com/28thJune-4thJuly/internet_brand.htm, pp. 1-3 (Jul. 8, 2003).

"Our Amazon.com Policy", http://monkeyfist.com/profile/amazon (Jul. 8, 2003).

"Where Are They Now? Search Engines We've Known & Loved", Sullivan, D., http://www.searchenginewatch.com/sereport/article.php/2175241, pp. 1-4 (Mar. 4, 2003).

"Choosing", Boedeker, T. et al., *Law Office Computing* pp. 50-55 (1995).

"Boolean Searching" http://www.cris.com/-eti/Boolean.html (1996).

"Agent Searching" http://www.cris.com/-eti/agent.html (1996).

"An Essential Ingredient: Post Recognition Processing", Bish, R., *Imaging World* (1996).

"Forms Processing Products & Services", http://www.textware.com/formspro.html, pp. 1-3.

"Your Forms Processing Solution", *FormWare for Windows 95/NT* (1995).

"Introduction to Dataware's CD-ROM Product and Services", pp. 1-12, http://www.dataware.com/site/prodserv/cdintro.htm (Nov. 12, 1996).

"Issues in the Design of Hypermedia Systems", Halasz, F. (1990).

"Dataware Lands $6.6M GPO Pact", Moore J., *Marketplace*, pp. 84, 86 (1995).

"Personal Text-Retrieval Software Works with Calera's WordScan", ZyLAB, *PCMagazine* p. 68 (Jan. 24, 1995).

"Retrieving Text on the Net", ZyLAB, *PC Magazine*, p. 61, (Nov. 21, 1995).

"Hip Products" ZyLAB Europe BV.—Products, p. 1, http://www.zylab.n1/zylab/p2/prods.html (Dec. 29, 1997).

"HyperWriter for Windows", *PC Magazine*, pp. 140-142 (Feb. 7, 1995).

Product Summary of MicroRetrieval Corp., Text and image search/retrieval program, Software product specification, p. 1.

Jupiterdirect—Search Engines, p. 1, http://www.jupiterdirect.com/bin/container.p1/897 (Jul. 8, 2003).

G. Pascal Zachery, "The Godfather." *Wired*. Wired (unknown), Nov. 30, 1997.

Steve Ditlea, "Ted Nelson's Big Step." techreview.com. techreview.com (unknown), Oct. 31, 1998.

Webopedia, "hypertext," *Webopedia*, Webopedia (unknown) Sep. 1, 1996.

Webopedia, "hypermedia," *Webopedia*, Webopedia (unknown) Oct. 5, 1997.

Webopedia, "hyperlink," *Webopedia*, Webopedia (unknown) Feb. 25, 1997.

Webopedia, "hot link," *Webopedia*, Webopedia (unknown) Sep. 1, 1996.

L. Hillman, "Sum: Am. English Word Frequency Lists," *Linguist* List 7.583, Oct. 31, 1996.

J.M. Carroll, et al. "Computer Selection of Keywords Using Word-Frequency Analysis," http://www.vuw.ac.nz/lals/lals508/vrc.html, Washington, D.C., vol. 20, No. 3, pp. 227-233, Sep. 5, 1969.

G. Pascal Zachery, "The Godfather," Wired, Wired (unknown), (Nov. 30, 1997).

Steve Ditlea, "Ted Nelson's Big Step," techreview.com, techreview.com (unknown), (Oct. 31, 1998).

Webopedia, "hypertext," Webopedia, Webopedia (unknown), (Sep. 1, 1996).

Webopedia, "hypermedia," Webopedia, Webopedia (unknown), (Oct. 5, 1997).

Webopedia, "hyperlink," Webopedia, Webopedia (unknown), (Feb. 25, 1997).

Webopedia, "hot link," Webopedia, Webopedia (unknown), (Sep. 1, 1996).

W.N. Francis & H. Kucera, "Frequency Analysis of English Usage," Boston: Houghton-Mifflin, (1982).

L. Hillman, "Sum: Am. English Word Frequency Lists," Linguist List 7.583, (1996).

* cited by examiner

Fig. 1

1. Search Excite for atomic bomb  ⏫

2. Search Excite for atomic bomb & Force  ⏫

3. Search Excite for atomic bomb & Nuclear  ⏫

4. Search Excite for atomic bomb & Weapon  ⏫

5. Search Excite for atomic bomb & Research  ⏫

6. Search Excite for atomic bomb & War  ☐

7. Search Excite for atomic bomb & Atomic  ☐

8. Search Excite for atomic bomb & Japanese  ☐

9. Search Excite for atomic bomb & Warfare  ☐

10. Search Excite for atomic bomb & War  ☐

Fig. 2

Books: See all 343 results in Books...

- The Making of the Atomic Bomb -- Richard Rhodes; Paperback
- In the Shadow of the Bomb -- Silvan S. Schweber; Hardcover
- Hiroshima: Why America Dropped the Atomic Bomb -- Ronald T. Takaki; Paperback

DVD: See all 6 results in DVD...

- Trinity and Beyond: The Atomic Bomb Movie (1995) -- DVD Keep Case
- Atomic Bomb Collection (Welcome to Ground Zero/Nukes in Space) -- DVD
- America's Atomic Bomb Tests (1997) -- DVD Snap Case

Video: See all 8 results in Video...

- Trinity and Beyond: The Atomic Bomb Movie, Special Director's Cut (1997) -- William Shatner; VHS
- The Atomic Bomb Collection -- William Shatner; VHS
- America's Atomic Bomb Tests 15 TAPE SET -- VHS

Auctions: See all 25 results in Auctions...

- Miracle Mile *Very Rare* Anthony Edwards (ER) Atomic Bomb -- Current Bid: $14.99 -- Ends in 2 days, 04:15:09
- President Truman Announces the A-Bomb Atomic Bomb which was dropped on Japan bri -- Current Bid: $4.95 -- Ends in 3 days, 16:58:05
- No Place To Hide by David Bradley HB 1948 Atomic Bomb #1816 -- Current Bid: $4.00 -- Ends in 5 days, 09:03:50 zShops: See all 66 results in zShops...

- President Truman Announces the A-Bomb Atomic Bomb which was dropped on Japan -- Price: $6.95
- The history of the atomic bomb. American Heritage Junior Library. -- Price: $10.00
- President Truman Announces the A-Bomb Atomic Bomb which was dropped on Japan -- Price: $6.95

Trinity and Beyond: The Atomic Bomb Movie, Special Director's Cut (1997) -- William Shatner; VHS

Fig. 5

TARGETED E-COMMERCE SYSTEM

This application is a continuation-in-part of our application Ser. No. 09/630,227 filed Aug. 1, 2000 and our application Ser. No. 09/703,006 filed Oct. 31, 2000 (U.S. Pat. No. 6,546,386 issued Apr. 8, 2003).

FIELD OF THE INVENTION

The invention relates to providing a system for providing a list of related e-commerce products to any document appearing on a computer device.

BACKGROUND OF THE INVENTION

The Internet delivers trillions of words to billions of screens. The Net contains an enormous amount of material. Systems exist which survey web sites to determine the traffic (hits) that take place for a given web page. Some systems exist which will suggest products to a user based upon their selection of a particular web page or a particular topic. No system exists however, to analyze survey statistics to select and suggest e-commerce products that would be of interest to those persons selecting particular content and portions of that content, to suggest highly related products that can be purchased by the user. This would be highly beneficial to create a market for those products to persons that are already recognized to be interested in a particular subject.

For example, while searching an article on basketball, various products could be suggested on the screen for purchase, such as sports supplies, sports clothing and books and magazines on the subject of basketball. If it could be determined that the searcher was particularly interested in professional basketball, the products suggested could be narrowed to be more relevant to that interest.

OBJECTS OF THE INVENTION

It is an object of this invention to determine the interests of users of the Internet and suggest e-commerce products for purchase, relevant to the user's interests.

It is a further object of the invention to provide a system to determine highly relevant products to suggest to internet users based upon their interest in or queries based upon any content, such as magazine articles, news stories or any other text.

SUMMARY OF THE INVENTION

The targeted e-commerce system of this invention uses a product database and an automated keyword tagging system to determine products that are best suited for display on a given content page. As the content is being prepared for publishing on a web site, it is tagged with one or more pre-selected keywords either manually or using an automated tagging process as described in parent applications "Hotwording" application Ser. No. 09/630,227 and "Brilliant Queries" application Ser. No. 09/703,006. These keywords are submitted as input to a product database which selects one or more products for display on the page. The products are displayed either as text entries, using titled thumbnails or other conventional techniques on product merchandising on electronic devices. The text entry, thumbnail or other method is essentially a link that leads to a product display page on the site or on a separate retail site.

The product database contains fields that describe the products along with their associated keywords. These fields might include the internal product id, the product url, the product price, the product title, the sale price (if any), and the full product description.

Products are associated with one or more keywords which are manually or automatically selected. An example of keywords associated with, for instance, "Basketball", would be "clothing" or "celebrity". All product keywords are listed in a product keyword table. Product selections are made by using the product keyword table to create a database match, or close match when multiple keywords are considered, with the keyword table from the content selection, to limit the product display to only products associated with specific keywords or multiple keyword clusters.

Product selection can be done statically for simple publishing content or the product selection can be performed on a server dynamically, to make products instantly available for display on the web site.

With the static publishing model, the product selection is done at the time the content is submitted for publishing and the chosen products are embedded in the page prior to upload to the server. These pages can be reprocessed and uploaded to the server repeatedly as the product database changes.

The dynamic publishing model relies on a product database that is running live on the server and gateway interface technology to query the product database and generate product selection on a query by query basis. This model allows for a product selection that is instantly updated on every content page as the product database is updated. If the product database has been enhanced via the above-described system of metatagging, then the match can be undertaken via sophisticated statistical matching techniques. If the product database is maintained without such enhancement, but is capable of responding to Boolean ANDed queries, then the matching can be accomplished through the automated submission of Boolean ANDed queries derived from the metatagging process, as described in the "Brilliant Query" application Ser. No. 09/703,006, filed Oct. 31, 2000.

Traffic survey data of web content may be done on several levels. These include:

1. Content selection, the general nature of the content.
2. Use of "Hotwording" as described in our parent application, which would provide data on both the content and keywording.
3. Use of a "Brilliant Query" as described in our parent application, which would provide data based on both a "hook" and a keyword.
4. Data from a targeted e-commerce site to which metatagging or keywords have been added with the methodologies described in this application, and its precursors.

The data can be analyzed by researchers looking at the word frequency analysis of the content and keywords chosen and then choosing products that are relevant to the subject matter. Products can also be chosen by adding metatagging or keywording to an inventory of products, and matching the content keywording to the product keywording.

As discussed in the "Brilliant Query" application, more definitive results will be obtained if keyword clusters, such as a doublet (a two word combination) or a triplet (three word combination) are analyzed, as they are far more revealing than a single word or general content category.

There will be cases where the number of products displayed on a given page will need to be limited. When the number of products matching the keywords for a given page exceeds this limit, there are one or more criteria for determining the products that are displayed. First, all products that are associated with all keywords are selected as a set. The product list is then ordered by one or more of the following optional criteria:

1) Date of product listing (how new is the product).
2) Product sale status (is there a special sale on the product?).
3) Product Price (more expensive or less expensive).
4) Keyword weighting (a product that matches the keyword that most appears in the content will be displayed before a product that matches a lower frequency keyword). The list is then limited to a prespecified number of products based on the site's design preferences.

As stated in the "Brilliant Query" application, Brilliant queries are a collection of one or more pairings of a hook and a keyword. For example, an article on Basketball might have the following Brilliant queries:

1. Search for more information on BASKETBALL and CELEBRITY
2. Search for more information on BASKETBALL and CLOTHING
3. Search for more information on BASKETBALL and FASHION
4. Search for more information on BASKETBALL and COMMERCE The hook is BASKETBALL and the keywords are CELEBRITY, CLOTHING, FASHION and COMMERCE.

Metatagged keywords are simply a collection of words, generated automatically or manually, that are deemed to be indicative of the topic matter or one of the topics for a given content selection. Metatagged keywords are determined by comparison of a pre-determined list of keywords to the text of the content selection. If the content selection contains one or more of the keywords, or an appropriate synonym, then that keyword is associated with that text body and potentially used for the Brilliant Query. Keywords may also be determined by statistical word frequency analysis of the text, with or without manual selection and addition of synonyms.

Keywords are generated by automatic or manual statistical and empirical analysis of the body of content to be enhanced or a comparable body of content. The keyword list for a given content source is generated through the use of word frequency analysis, stopword removal and finally, manual selection using empirical testing of the results generated by a given potential keyword. Based on experience, a solid keyword list usually runs between 250 and 1000 words and phrases which are chosen by the system designer.

Also, keywords can be manually tuned through the use of a thesaurus feature whereby a given keyword can be associated with one or more synonyms that would indicate the use of the keyword whenever one or more of the synonyms appear in the body of text to be enhanced. This process is applied to both the content and the product database.

DESCRIPTION OF THE PREFERRED EMBODIMENTS

Figure 1:
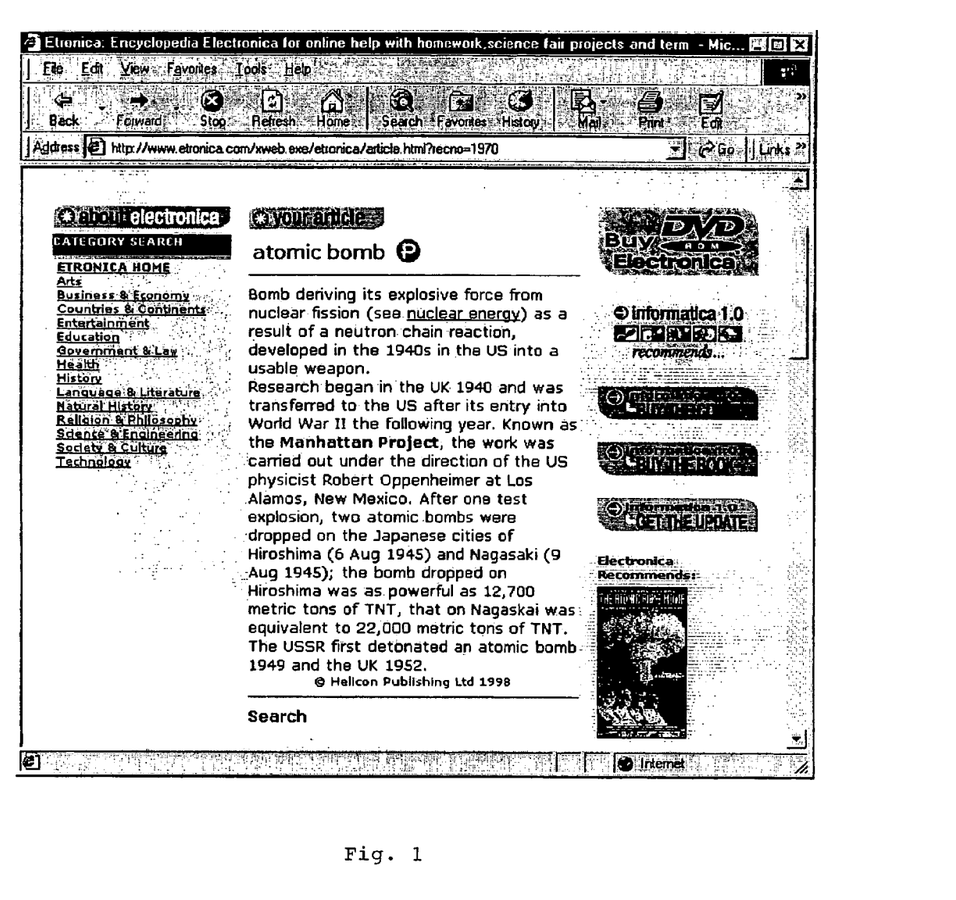
FIG. 1 is a depiction of a computer screen showing a body of text entitled, "Atomic Bomb" with targeted e-commerce offers.
Figure 2:
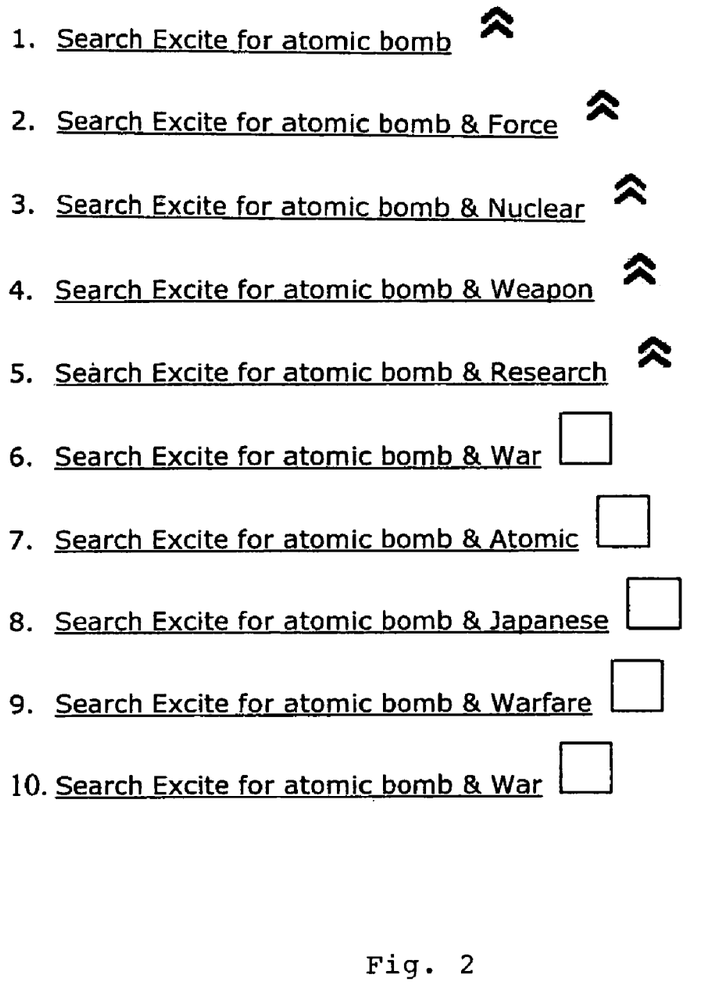
FIG. 2 is a depiction of a list of Brilliant Queries, revealing the keywords metatagged to the "Atomic Bomb" article.

FIG. 1 is a body of text comprising an Encyclopedia Electronica article entitled, "Atomic Bomb". Metatagged keywords associated with the article are shown in FIG. 2, as the second operand in each of the recommended "Brilliant Queries". Editorial judgment resulted in "Atomic Bomb" being the chosen as the "hook", the primary subject matter of the article, as indicated by it's choice as the title of the article by the Encyclopedia editors.

Figure 3:
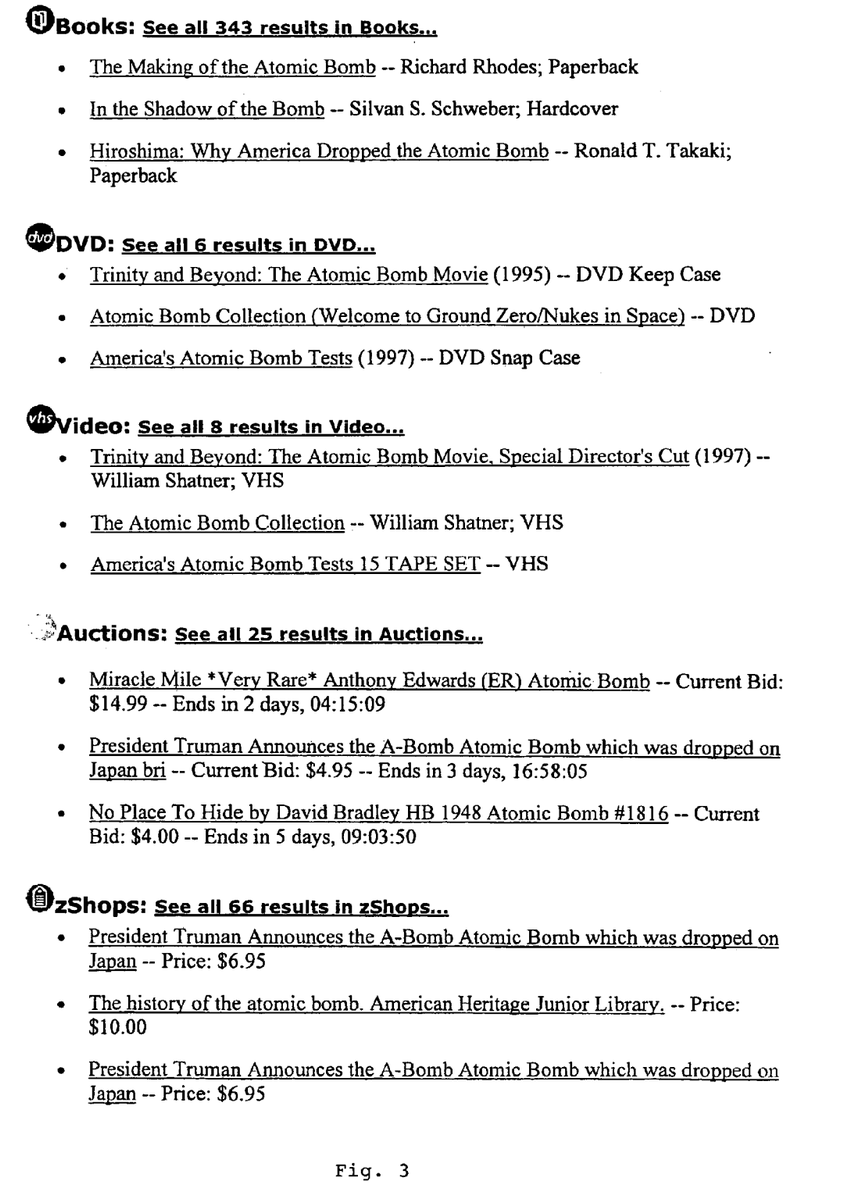
FIG. 3 is a partial pre-selected product list, based on an Amazon product search on the phrase, 'Atomic Bomb'.
Figure 4:
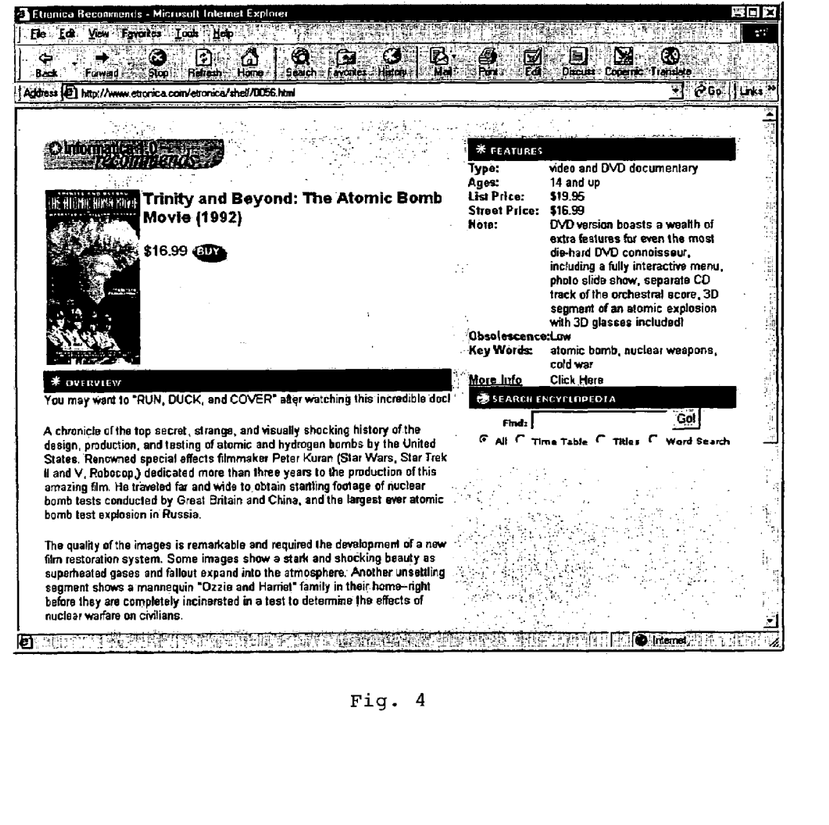
FIG. 4 is a specific product merchandising page, revealing the keywords metatagged to this particular product.
Figure 5:
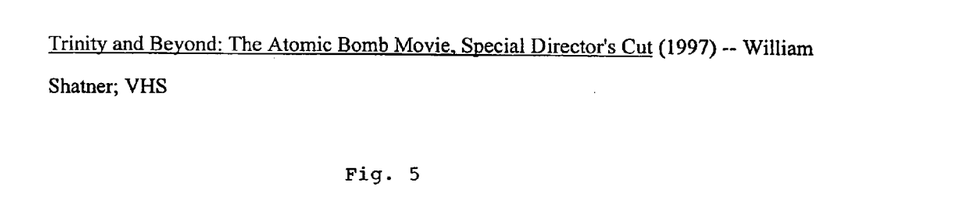
FIG. 5 is the reduced a list of the products that result from keyword matching.

FIG. 3 shows a general list of matching products across all catagories results from a search on "Atomic Bomb" on the www.amazon.com product search engine. Keywords metatagged to one of the products found in the Amazon search, after analysis of the product description text, are indicated in FIG. 4 (right side, Features sidebar). The keywords metatagged to the original text can be matched to the keywords matatagged to the products, to provide a list of products which are highly relevant to the interests of the reader of the text (FIG. 5).

Thus, when the consumer/reader selects a particular article and a particular query from the text, a list of products available for purchase appears on the screen, the products being highly related to the query. Each of the products listed may contain a link to a retail purchase site.

Having thus described the invention,

We claim:

1. A computer implemented method of selecting at least one file representing at least one product, the file relating to a web page on the World Wide Web, the method comprising:
   receiving the web page having content therein;
   analyzing the web page to detect a context for the web page using a statistical analysis of the web page content; and
   selecting at least one file representing at least one product related to the detected context.

2. The method of claim 1, wherein the selected file is at least one of a link, a document, or a thumbnail.

3. The method of claim 1, further comprising:
   receiving notice of a user request for the web page, said user request being received after the execution of said selecting.

4. The method of claim 1, wherein said analyzing is executed to detect a plurality of contexts for the web page, and wherein said selecting is executed to select a plurality of products corresponding to the plurality of contexts, the method further comprising:
   ranking the plurality of contexts and the plurality of products.

5. The method of claim 1, further comprising:
   receiving notice of a user request for the web page, said user request being received prior to the execution of said analyzing or said selecting.

6. The method of claim 1, wherein said analyzing comprises:
   parsing the content of the web page to discover one or more keywords published as part of the content; and
   evaluating the one or more keywords to detect the context.

7. The method of claim 6, wherein said parsing comprises:
   performing a statistical word frequency analysis of the content to discover the one or more keywords.

8. The method of claim 6, wherein said parsing comprises:
   analyzing at least one metatag in the web page to discover the one or more keywords.

9. The method of claim 6, wherein said evaluating comprises:
    comparing the one or more keywords with a synonym to detect the context.

10. A method of selecting and displaying at least one file representing at least one product, the file relating to a web page on the World Wide Web, the method comprising:
    receiving notice of a user request for a web page;
    receiving the requested web page having content therein;
    analyzing the requested web page to detect a context for the requested web page using a statistical analysis of the web page content;
    selecting at least one file representing at least one product related to the detected context;
    producing a second page including the requested web page and the file; and
    displaying the second page to the user.

11. The method of claim 10, wherein said analyzing is executed to detect a plurality of contexts for the requested web page, and wherein said selecting is executed to select a plurality of products corresponding to the plurality of contexts, the method further comprising:
    ranking the plurality of contexts and the plurality of products, such that said displaying is executed to display the plurality of products in accordance with the ranking.

12. A computer readable storage medium including computer executable code for selecting at least one file representing at least one product, the file relating to a web page on the World Wide Web, the code enabling the steps of:
    receiving the web page having content therein;
    analyzing the web page to detect a context for the web page using a statistical analysis of the web page content; and
    selecting at least one file representing at least one product related to the detected context.

* * * * *